US010427803B2

(12) United States Patent
Von Zeppelin

(10) Patent No.: US 10,427,803 B2
(45) Date of Patent: Oct. 1, 2019

(54) ANCHORING VEHICLE FOR ANCHORING AN AIRSHIP AT THE TAIL WHILST COUPLED TO A MOORING-MAST AT THE BOW

(71) Applicant: Wolfgang Von Zeppelin, Markdorf (DE)

(72) Inventor: Wolfgang Von Zeppelin, Markdorf (DE)

( * ) Notice: Subject to any disclaimer, the term of this patent is extended or adjusted under 35 U.S.C. 154(b) by 213 days.

(21) Appl. No.: 15/622,476

(22) Filed: Jun. 14, 2017

(65) Prior Publication Data
US 2017/0361946 A1    Dec. 21, 2017

(30) Foreign Application Priority Data
Jun. 17, 2016    (DE) .................... 10 2016 007 123

(51) Int. Cl.
*B64F 1/14*    (2006.01)
*B64B 1/66*    (2006.01)
*G05D 1/00*    (2006.01)
*G05D 1/02*    (2006.01)

(52) U.S. Cl.
CPC ................. *B64F 1/14* (2013.01); *B64B 1/66* (2013.01); *G05D 1/0011* (2013.01); *G05D 1/021* (2013.01)

(58) Field of Classification Search
CPC ........... B64B 1/66; B64F 1/14; G05D 1/0011; G05D 1/021
USPC ....................................................... 244/116
See application file for complete search history.

(56) References Cited

U.S. PATENT DOCUMENTS

| 1,119,646 A | | 12/1914 | Schleinitz | |
| 1,465,246 A | * | 8/1923 | Lemm | B64F 1/14 244/116 |
| 1,734,812 A | * | 11/1929 | Krell | B64F 1/14 244/116 |
| 1,748,500 A | | 2/1930 | Thaden | |

(Continued)

FOREIGN PATENT DOCUMENTS

| DE | 397 795 C | 6/1924 |
| DE | 101 64 062 A1 | 7/2003 |
| DE | 101 64 067 A1 | 7/2003 |

OTHER PUBLICATIONS

Pfeiffer, Eduard A. "Fahren and Fliegen" ["Driving and Flying"] Ein Buch fuer Alle von Auto, Flugzeug, Zeppelin, Franckh'sche Verlagshandlung, Stuttgart, p. 94 with English translation.

*Primary Examiner* — Claude J Brown
(74) *Attorney, Agent, or Firm* — Collard & Roe, P.C.

(57) ABSTRACT

An anchoring vehicle for anchoring an airship at the tail while coupled to a mooring mast at the bow. Airships are generally coupled at the bow to a mooring-mast after landing on the ground. However, vertical gusts can result to a considerable amount of damage to the airship with this mechanism. To avoid such damage, the proposed anchoring mechanism designed as an anchoring vehicle, is coupled via an anchor-mast to the tail of the airship near the height of its middle axis. Thus, the vehicle stabilizes the airship vertically and can independently maneuver horizontally without considerable rolling resistance to a predefined airship position, thus preventing a tilting moment. The all-terrain, autonomous anchoring vehicle captures direction and strength data of horizontal deflection caused by wind power via sensors on the anchoring-mast. A control unit regulates the drive systems for navigation and wheel drive.

7 Claims, 4 Drawing Sheets

(56) References Cited

U.S. PATENT DOCUMENTS

| | | | | |
|---|---|---|---|---|
| 1,778,394 A | * | 10/1930 | Krell | B64F 1/14 244/116 |
| 1,799,677 A | * | 4/1931 | Clergue | B64F 1/14 244/116 |
| 1,812,237 A | * | 6/1931 | Ancira | B64B 1/66 244/116 |
| 1,847,634 A | * | 3/1932 | Strieffler | B64F 1/14 244/115 |
| 1,853,081 A | * | 4/1932 | Powelson | B64F 1/14 244/116 |
| 1,867,591 A | | 7/1932 | Pranke | |
| 1,918,523 A | * | 7/1933 | Dyer | B64F 1/14 244/116 |
| 1,972,863 A | * | 9/1934 | Bolster | B64F 1/14 244/116 |
| 2,704,193 A | * | 3/1955 | Alard | B64B 1/66 244/116 |
| 3,905,567 A | * | 9/1975 | Menke | B64F 1/14 244/115 |
| 3,976,268 A | * | 8/1976 | Crosby, Jr. | B64F 1/12 244/115 |
| 5,176,341 A | * | 1/1993 | Ishikawa | B64F 1/14 24/136 R |
| 5,431,359 A | * | 7/1995 | Belie | B64B 1/66 244/116 |
| 5,533,694 A | * | 7/1996 | Carpenter | A63H 27/08 244/153 R |
| 2005/0156082 A1 | * | 7/2005 | Eberle | B64B 1/58 244/96 |
| 2009/0272845 A1 | * | 11/2009 | Thiele | B64F 1/14 244/116 |

\* cited by examiner

ANCHORING VEHICLE FOR ANCHORING AN AIRSHIP AT THE TAIL WHILST COUPLED TO A MOORING-MAST AT THE BOW

CROSS REFERENCE TO RELATED APPLICATIONS

Applicant claims priority under 35 U.S.C. § 119 of German Application No. 10 2016 007 123.0 filed on Jun. 17, 2016, the disclosure of which is incorporated by reference.

BACKGROUND OF THE INVENTION

1. Field of the Invention

This application concerns an anchoring vehicle for anchoring an airship at the tail whilst coupled to a mooring mast at the bow.

2. The Prior Art

Airships are generally coupled with the bow to a mooring-mast after landing on the ground. Due to the large wind-exposed surface of an airship, air currents across the longitudinal axis or up- and downward winds from any direction result in considerable forces on the airship.

These forces can pivot the airship into the current prevailing wind direction at any time if it is connected at the bow or in general forward of the aerodynamic center of wind pressure. Vertical gusts can be capable of pulling the tail of the airship up and possibly suddenly press it down again causing hard impact on the ground, which can result in a considerable amount of damage.

Many proposals have been made to stabilize the airship under these impairments during boarding/deboarding of passengers, loading/unloading procedures and onground times.

An anchorage is known from the German Patent No. DE 397795, which connects the tail end of an airship to a vehicle and has been made so heavy that there is no threat of lifting off ground.

Across the longitudinal axis of the airship, this anchoring vehicle has non-pivoting wheels, which can roll around the anchoring point on a well leveled asphalted or cemented circular pad. However, a disadvantage is that in the event of a cross wind force and due to the high rolling resistance of the heavily weighted vehicle, it induces a not inconsiderable rolling moment (tipping moment) of the airship, because it catches significantly under the longitudinal axis.

To minimize the high rolling resistance of an anchoring vehicle as described above, it has been proposed to provide an annular rail track as disclosed in U.S. Pat. No. 1,748,500. A similar proposal was made in U.S. Pat. No. 1,119,646 to build a rotating platform and with U.S. Pat. No. 1,867,591 to arrange a rotating platform on guided rail tracks.

The German patent application publication DE 101 64 067 A1 describes a loading platform that moves around the bow mooring-mast on rail tracks with controlled drive.

A heavy locomotive is described on page 94 in the book "Fahren and Fliegen" ["Driving and Flying"], Franckh'sche Verlagshandlung, Stuttgart, on which an airship is mounted to its free end and which can drive on a curved rail to position the airship into the wind.

However, these tail section follow-up anchoring system proposals are highly expensive, particularly on uneven surfaces and at exterior landing places, and are inflexible with regard to adapting to various airship sizes. Furthermore, what all have in common is that adequate personnel is required. Finally, due to the coupling at the tail far below the middle axis, the abovementioned proposals do not avoid the tipping moment in the event of cross winds.

SUMMARY OF THE INVENTION

The invention is based on the task of securing an airship coupled to a bow mooring mast at the tail end as well. The proposed anchorage device, designed as an anchoring vehicle, shall be able to follow (pivot into the wind) the airship depending on wind direction, without significant rolling resistance and thus to avoid the event of a tilting moment. Furthermore, the anchoring vehicle shall be flexible, i.e. can be deployed on site without structural installations.

As an additional utilization of the proposed anchoring vehicle, it shall follow the airship independently while the airship is coupled to a mobile bow mooring-mast during maneuvering on ground, for example entering or exiting the hangar whereas the distance covered is controlled manually or by a specified glide path.

This task is achieved by an anchoring vehicle for anchoring an airship at a tail of the airship, comprising a height adjustable anchoring-mast mounted to the anchoring vehicle with a ball and socket joint. A coupling location of the anchoring-mast is positioned at a height of the airship's middle axis. the anchoring mast has coupling devices, spring devices and damping devices, and a minimum of three suspension cables each equipped with a force sensor, or a minimum of two sensors with unequal operating direction that are integrated in a rigid coupling of the anchoring-mast. There is a measuring device for measuring horizontal wind force upon the airship arranged on the anchoring vehicle. The vehicle comprises at least three wheels that are drivable and steerable, and a control unit and servomotors for steering and driving the wheels depending on measured values of the force sensors, enabling the anchoring vehicle to independently move in a horizontal direction to the airship's position dictated by the wind direction.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
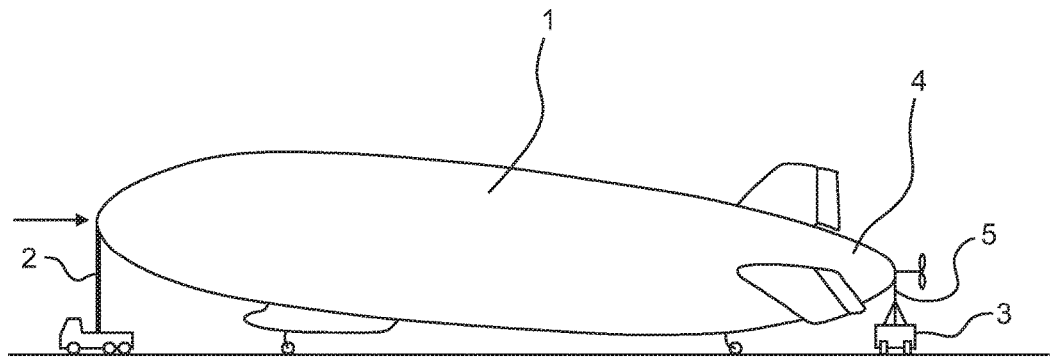
FIG. 1 shows a side view of an airship (1) connected to a bow mooring-mast (2) and an anchoring vehicle (3).
Figure 2:
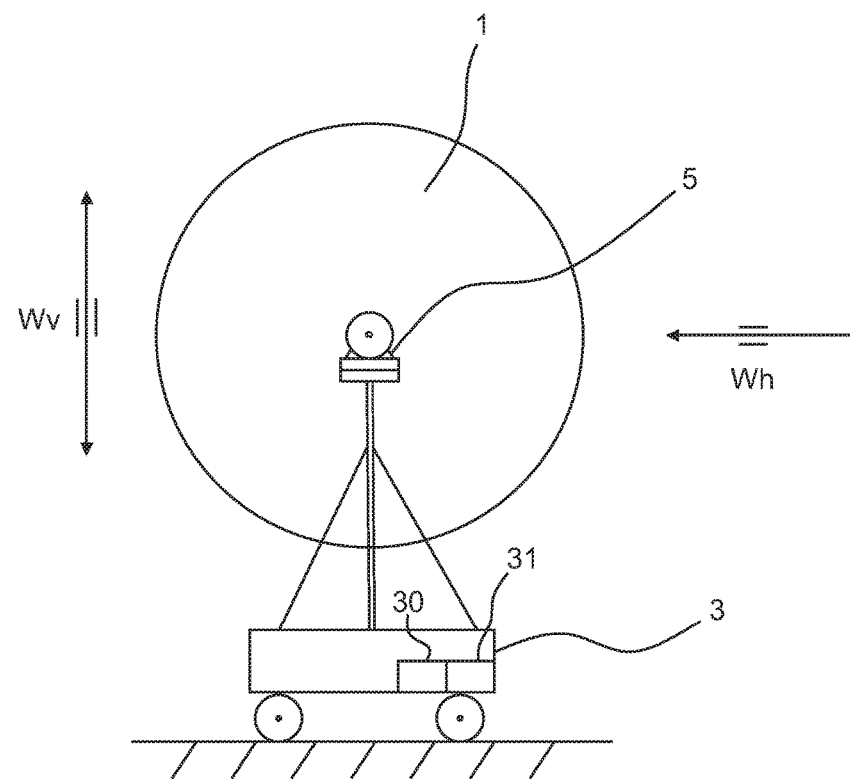
FIG. 2 shows the rear view of an airship (1) with an anchoring vehicle (3) and its coupling position (5) as well as possible dangerous wind impact directions, horizontal (Wh) and vertical (Wv).
Figure 3:
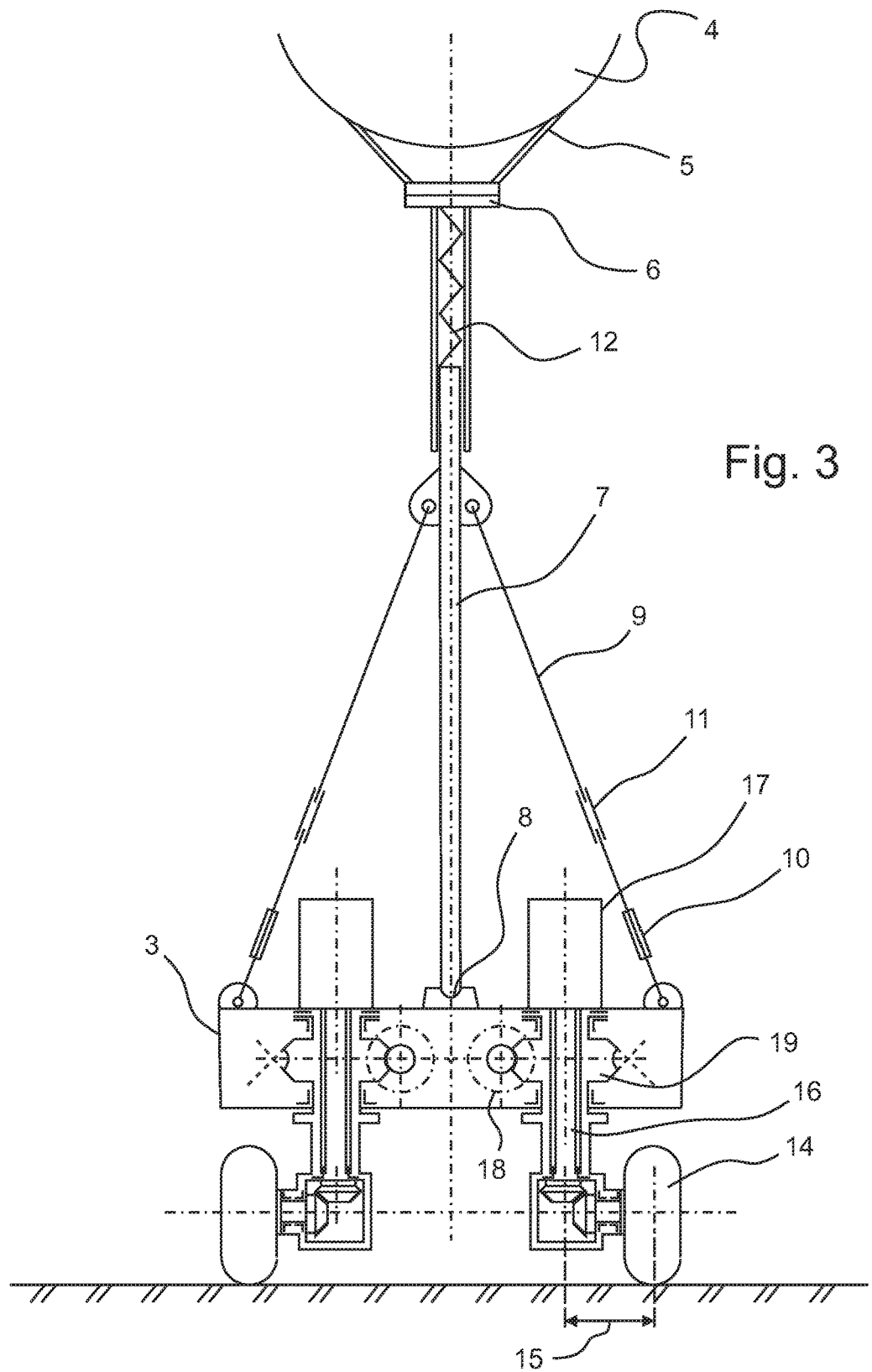
FIG. 3 shows a complete anchoring vehicle (3) according to the invention in the embodiment with sensors (10) in the suspension cables (9) for the anchoring-mast (7), which is mounted with a ball and socket joint (8).
Figure 4:
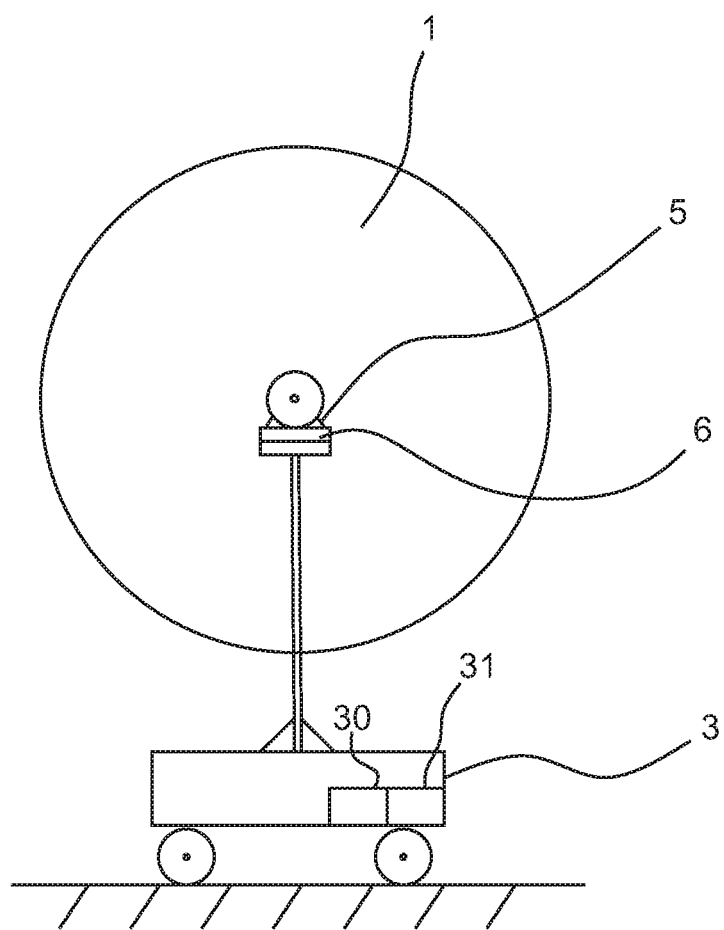
FIG. 4 shows a schematic of the alternative embodiment of the anchoring vehicle (3) with the sensors (20) integrated in the coupling (6) and the anchoring-mast (7) is rigidly mounted to the vehicle.
Figure 5A:
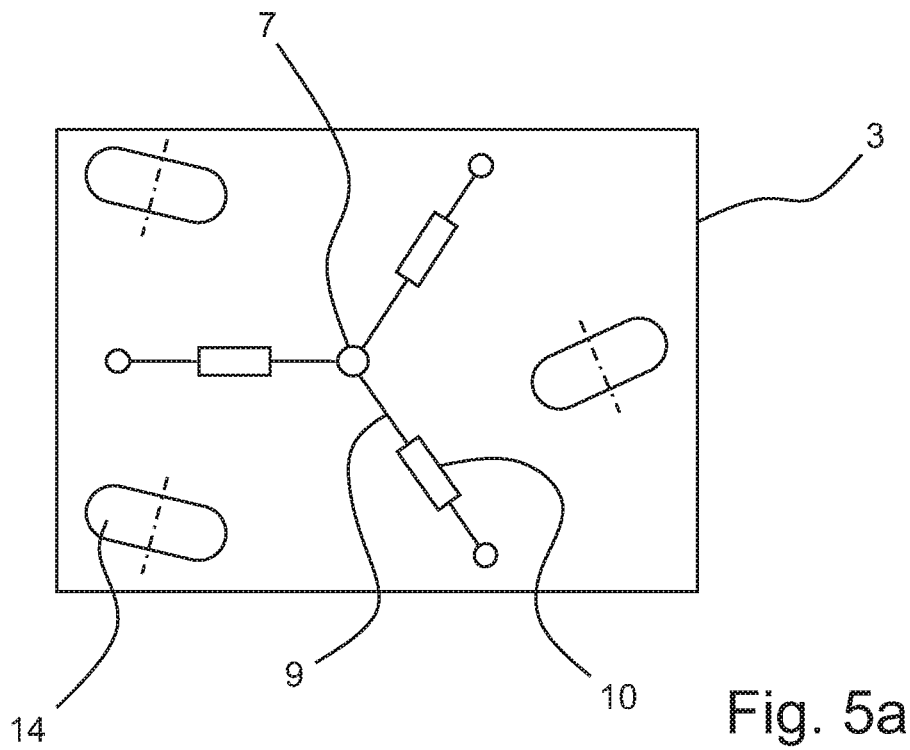
FIG. 5a shows a top view schematic illustration of the horizontal force measuring system with 3 sensors (10) in the suspension cables (9) for the anchoring-mast (7) according to FIG. 3.
Figure 5B:
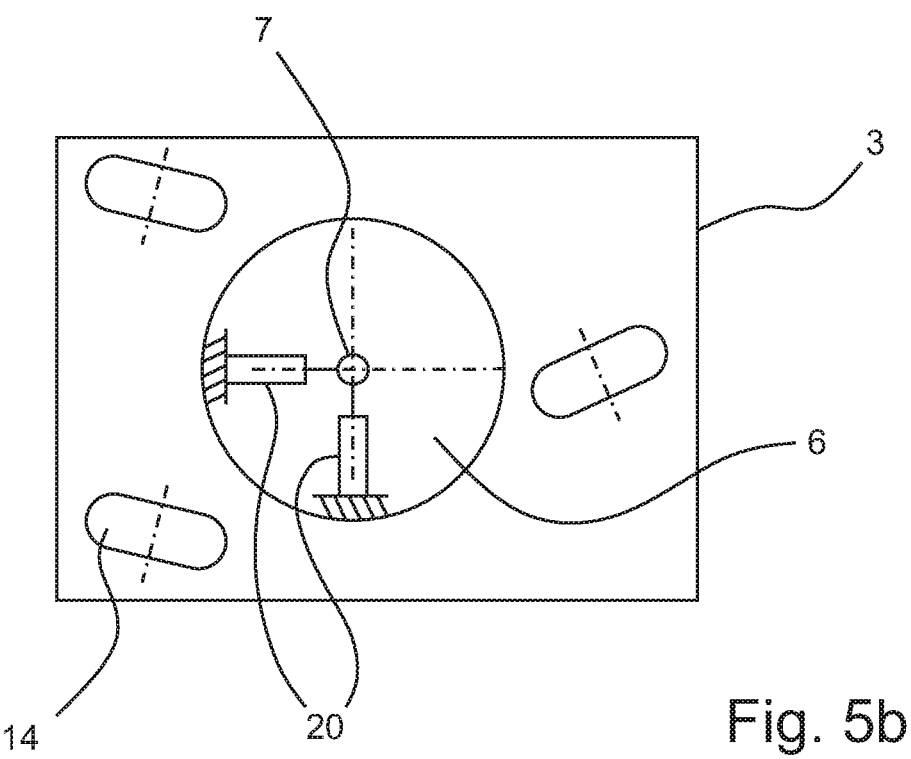
FIG. 5b shows a top view schematic illustration of an alternative embodiment of the horizontal force measuring system with 2 sensors (20) integrated in the coupling (6) according to FIG. 4.

According to the invention the proposed anchoring vehicle (3) has a vertical anchoring-mast (7), preferably connected at the tail (4) of the airship (1), for example with a standard electromagnetic coupling (6) or mechanically driven holding brackets. The coupling location (5) is near the height of airship's middle axis. The anchoring-mast (7) is height adjustable, has a spring device (12) and a damping device (not shown). It is mounted to the vehicle's chassis with a ball and socket joint or universal joints (8) for flexibility and is held in position with a minimum of three suspension cables (9).

The anchoring vehicle is equipped with a minimum of three steerable wheels (14) with a positive steering roll radius (15) and preferably has all-terrain tires. Wheel drive is carried out with an appropriate wheel gear mechanism (16) and the aid of a servomotor (17) each. Wheel steering is also carried out with the aid of a servomotor (18) and an intermediate gear mechanism (19). Control of direction and velocity drive is carried out by a control unit (not shown), which processes the force measurements of the sensors (10).

The anchoring vehicle (3) has its own power supply (30) provided by accumulators (31) or a power unit. If necessary, additional weight can be loaded to avoid potential lifting of the vehicle caused by vertical wind forces.

As soon as the airship (1) is coupled to the anchoring-mast (7) the tail of the airship is only capable of slight movement in the event of vertical wind gusts (Wv) due to the tolerations of spring and damping devices.

In the case of horizontal winds (Wh) the control unit captures direction and force of the lateral deflection of the anchoring-mast (7) at the coupling (5) from the force sensors (10) in the suspension cables (9) and begins to readjust the neutral position of the anchoring-mast. This occurs by driving or steering the wheels (14) of the anchoring vehicle in the target direction. This enables the vehicle to follow the airship's movement into the prevailing wind with nearly no time delay. During minor movement on unpaved ground the positive steering roll radius (15) prevents a wheel (14) from digging into the ground, which would be the case if the steering roll radius was zero.

A further alternative embodiment of the sensor system as described above in the suspension cables (9), is the arrangement of preferably two tension/pressure sensors (20) with unequal operating direction integrated in the coupling (6), whereas the anchoring-mast (7) is rigidly mounted to the vehicle.

Other than force sensors, distance gauging sensors could also be used to measure deflection of the airship relative to the anchoring vehicle.

Advantageously, direction and strength of wind forces measured by the sensors are also transferred to the cockpit of the airship (1).

To enable universal utilization of the anchoring vehicle (3) it is further proposed that it can also be switched to a different control mode, for example for the purpose of maneuvering the anchoring vehicle (3) to the appropriate location for docking the anchoring-mast (7) to the airship. For this purpose a manually operated remote control system can be used for steering and speed.

An additional control mode is proposed for the case that the anchoring vehicle (3) must follow movement of the airship (1) whilst coupled to a mobile bow mooring-mast (2), for example a predefined path for entering or exiting the hangar. Systems used could be preferably inductive guidance but also optical or magnetic guidance. Further possibilities are laser navigation or a GPS system. In this control mode only independent direction guidance is deactivated, not independent following speed.

The advantages of the invention consist in particular that in lieu of the embodiment of the anchoring vehicle damage to the airship can be avoided. Particularly because the anchoring does not allow vertical gusts of wind to initiate vertical tail movement of the airship, whereas, with nearly no resistance, the airship is capable of pivoting horizontally to the prevailing wind without a tilting moment.

Due to the sensors the pilot can receive signals in the cockpit in the event of strong cross winds when the maximum permissible stress of the anchoring vehicle is attained and thus enabling him to carry out security measurements for the boarding/unboarding of passengers in due time.

A universal utilization of the anchoring vehicle is provided by the possibility to switch to different control modes, for example with a manually operated remote control system to maneuver the anchoring vehicle to the docking location. Or for example using inductive guidance for the anchoring vehicle's independent following of a mobile bow mooring-mast and maneuvering the airship to the airfield or for entering and exiting the hangar at low-risk under adverse wind conditions.

The automatic sensor controlled anchoring vehicle mast according to the invention can reduce security staff. Also, no further costly structural provisions are required to adapt to various airship sizes such as rail tracks on the airfield.

Accordingly, while only a few embodiments of the present invention have been shown and described, it is obvious that many changes and modifications may be made thereunto without departing from the spirit and scope of the invention.

REFERENCE NUMERAL LIST

1 Airship
2 Bow mooring-mast
3 Anchoring vehicle
4 Tail
5 Coupling location
6 Coupling
7 Anchoring-mast
8 Ball and socket joint
9 Suspension cable
10 Force sensor in suspension cable
11 Turnbuckle
12 Spring device
14 Wheel
15 Steering roll radius
16 Wheel gear mechanism
17 Servomotor wheel drive
18 Servomotor steering drive
19 Steering gear
20 Sensors in coupling
30 Power supply
31 Accumulator

What is claimed is:

1. An anchoring vehicle for anchoring an airship at a tail of the airship, comprising:
   a height adjustable anchoring-mast mounted to said anchoring vehicle with a ball and socket joint, a coupling location of said anchoring-mast being positioned at a height of a middle axis of the airship, the anchoring mast comprising:
   a) coupling devices and spring devices,
   b) a minimum of three suspension cables each equipped with a force sensor, or a minimum of two sensors that sense force/strain in two different directions and that are integrated in a rigid coupling of the anchoring-mast; and
   c) a measuring device for measuring horizontal wind force upon the airship arranged on the anchoring vehicle,
   at least three wheels that are drivable and steerable, and
   a control unit and servomotors for steering and driving the wheels depending on measured values of the force sensors, enabling the anchoring vehicle to independently move in a horizontal direction to the airship's position dictated by the wind direction.

2. The anchoring vehicle according to claim 1, wherein said coupling devices comprise electromagnetic or mechanically driven holding brackets.

3. The anchoring vehicle of claim 1, wherein said wheels have a positive steering roll radius.

4. The anchoring vehicle of claim 1, wherein said wheels of said anchoring vehicle have all-terrain tires.

5. The anchoring vehicle of claim 1, wherein the anchoring vehicle comprises a power supply.

6. The anchoring vehicle of claim 1, wherein the control unit can be switched to a different control mode should said anchoring-mast need to be maneuvered to a location for docking to said airship, and wherein said anchoring vehicle is configured to be maneuvered by remote control.

7. The anchoring vehicle of claim 2, wherein the control unit is configured to be switched to an additional control mode should the vehicle follow the motion of said airship coupled to a mobile bow mooring-mast, wherein the anchoring vehicle follows a designated path via inductive guidance, instead of independently following based on wind impact on said airship.

* * * * *